No. 656,066. Patented Aug. 14, 1900.
M. WALKER.
VEHICLE SPINDLE.
(Application filed Apr. 14, 1900.)
(No Model.)
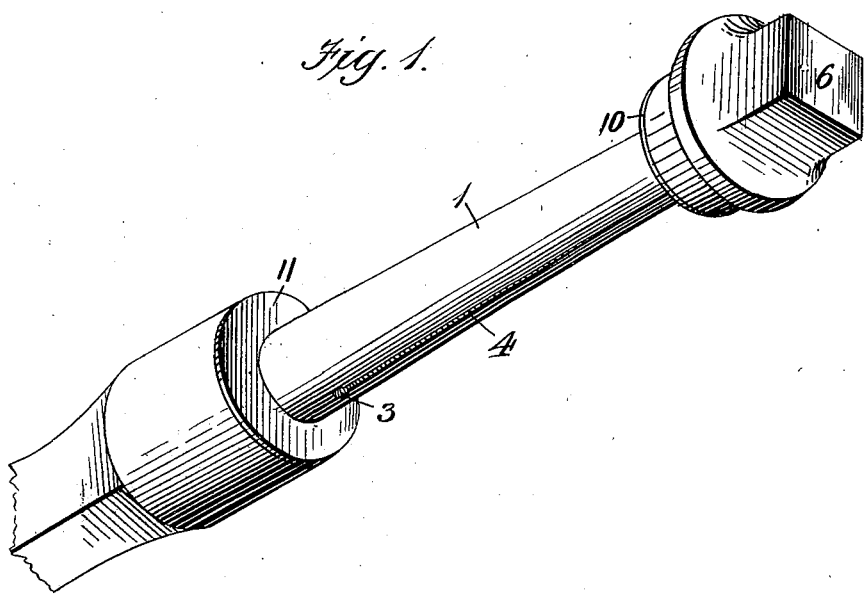
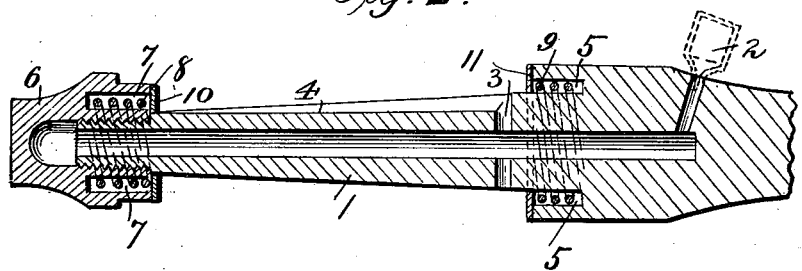
Witnesses:
F. L. Ourand
F. G. Radelfinger
Inventor:
Milton Walker,
By Louis Bagger & Co
Attorneys.

UNITED STATES PATENT OFFICE.

MILTON WALKER, OF LA HARPE, ILLINOIS.

VEHICLE-SPINDLE.

SPECIFICATION forming part of Letters Patent No. 656,066, dated August 14, 1900.

Application filed April 14, 1900. Serial No. 12,842. (No model.)

*To all whom it may concern:*

Be it known that I, MILTON WALKER, a citizen of the United States, residing at La Harpe, in the county of Hancock and State of Illinois, have invented new and useful Improvements in Vehicle-Wheel Spindles, of which the following is a specification.

My invention relates to improvements in vehicle-wheel spindles.

It has for its object more particularly to prevent lateral motion or vibrations of the vehicle-wheel spindle, and thus overcome the usual creaking action or noise incident thereto and to effect the ready lubrication or oiling of the spindle.

It consists of the detailed construction and combination of the parts, including their arrangement, substantially as hereinafter fully disclosed, and specifically pointed out by the claim.

In the accompanying drawings, illustrating the preferred embodiment of my invention, Figure 1 is a perspective view, and Fig. 2 is a longitudinal section thereof.

It will be understood that I do not limit myself to details herein, as they may be varied or changed at will without departing from the spirit of my invention and the same yet remain intact and be protected.

In carrying out my invention I provide a spindle 1 of any usual construction in its general outlines and having a lubricant receptacle or holder 2, preferably integral therewith, from which the lubricant or oil is suitably passed or fed to the spindle through a transverse passage or channel 3 and a longitudinal passage 4 made therein. These, however, are only incidental to my invention.

The spindle 1 has an annular or circular chamber or socket 5 at its inner end, and at its outer end it is provided with a nut 6, having a similar or annular socket or chamber 7. In the sockets or chambers 5 7 are arranged the helical or coiled springs 8 9 of the rings or washers 10 11, respectively, said springs and rings or washers being arranged on the spindle 1, with the rings disposed so as to flank or bear against the ends of the wheel-hub. Normally the springs 8 9 are held under stress or compressed to cause the rings or washers to bear forcibly against the wheel-hub in opposite directions, and thus cushion the wheel from both sides against lateral motion or vibration, preventing it from wabbling or running unevenly upon its spindle, and consequently overcoming creaking action or noise, as common with vehicle-wheels.

My invention is also exceedingly simple, readily constructed, and cheaply manufactured.

Having thus fully described my invention, what I claim is—

A vehicle-axle spindle provided with a circular chamber at its inner end, a spiral spring seated in said chamber, a metal washer outside said chamber against which said spring bears, a cap-nut fitting the outer end of said spindle and provided with a circular chamber, a spiral spring fitted therein, and a metal washer outside said chamber and against which said spring bears to prevent lateral vibration to the hub, substantially as described.

In testimony whereof I have hereunto set my hand in presence of two subscribing witnesses.

MILTON WALKER.

Witnesses:
 THOMAS WALKER,
 R. B. WILLIAMS.